(12) United States Patent
Kinoshita (10) Patent No.: US 7,576,787 B2
(45) Date of Patent: Aug. 18, 2009

(54) IMAGE-PICKUP DEVICE, AND DEVICE AND METHOD FOR CORRECTING DEFECTIVE PIXEL

(75) Inventor: Hiroyuki Kinoshita, Tokyo (JP)

(73) Assignee: Sony Corporation (JP)

( * ) Notice: Subject to any disclaimer, the term of this patent is extended or adjusted under 35 U.S.C. 154(b) by 558 days.

(21) Appl. No.: 11/499,369

(22) Filed: Aug. 4, 2006

(65) Prior Publication Data

US 2007/0040920 A1 Feb. 22, 2007

(30) Foreign Application Priority Data

Aug. 18, 2005 (JP) ............................ P2005-237905

(51) Int. Cl.
*H04N 9/64* (2006.01)
(52) U.S. Cl. ..................... 348/247; 348/222.1; 382/275
(58) Field of Classification Search ................. 348/246, 348/247, 272–275; 382/212, 274
See application file for complete search history.

(56) References Cited

U.S. PATENT DOCUMENTS

| | | | |
|---|---|---|---|
| 6,340,989 B1 * | 1/2002 | Oda ............................. | 348/246 |
| 6,674,404 B1 | 1/2004 | Lee et al. | |
| 6,888,568 B1 * | 5/2005 | Neter ....................... | 348/222.1 |
| 2003/0169352 A1 | 9/2003 | Kitani | |
| 2005/0231617 A1 * | 10/2005 | Kitani ......................... | 348/247 |
| 2005/0253940 A1 * | 11/2005 | Chiba et al. .................. | 348/247 |

FOREIGN PATENT DOCUMENTS

| | | |
|---|---|---|
| EP | 1 250 000 A2 | 10/2002 |
| GB | 2 364 461 | 1/2002 |

* cited by examiner

*Primary Examiner*—David L Ometz
*Assistant Examiner*—Antoinette T Spinks
(74) *Attorney, Agent, or Firm*—Lerner, David, Littenberg, Krumholz & Mentlik, LLP

(57) ABSTRACT

An image-pickup device includes a solid-image-pickup element which can select between an ordinary mode wherein all of a plurality of pixel signals are sequentially read and at least one pixel-addition mode wherein the pixel signals corresponding to same-color filters are added and output; a defective-information-storage unit which stores position information of a defective pixel on the solid-image-pickup element in the ordinary mode; a signal-correction unit which corrects a pixel signal of a picked-up-image signal based on the position information; and a position-information conversion unit that converts the position information when the pixel-addition mode is selected so that the position information agrees with information about a pixel arrangement, the pixel-arrangement information corresponding to the picked-up-image signal generated in the pixel-addition mode, and that transmits the converted position information to the signal-correction unit.

12 Claims, 5 Drawing Sheets

FIG. 3A
ORDINARY READING MODE

|   | 0 | 1 | 2 | 3 | 4 | 5 | 6 | 7 | 8 |
|---|---|---|---|---|---|---|---|---|---|
| 0 | 00 | 01 | 02 | 03 | 04 | 05 | 06 | 07 | 08 |
| 1 | 10 | 11 | 12 | 13 | 14 | 15 | 16 | 17 | 18 |
| 2 | 20 | 21 | 22 | 23 | 24 | 25 | 26 | 27 | 28 |
| 3 | 30 | 31 | 32 | 33 | 34 | 35 | 36 | 37 | 38 |
| 4 | 40 | 41 | 42 | 43 | 44 | 45 | 46 | 47 | 48 |
| 5 | 50 | 51 | 52 | 53 | 54 | 55 | 56 | 57 | 58 |

FIG. 3B
ADDITION-AND-THINNING READING MODE

FIG. 4A

ORDINARY READING MODE

Hnorm

|  | 0 | 1 | 2 | 3 | 4 | 5 | 6 | 7 | 8 |
|---|---|---|---|---|---|---|---|---|---|
| 0 | 00 | ▨ | 02 | 03 | 04 | 05 | 06 | 07 | 08 |
| 1 | 10 | 11 | 12 | 13 | 14 | 15 | 16 | 17 | 18 |
| 2 | 20 | 21 | 22 | 23 | 24 | 25 | 26 | 27 | 28 |
| 3 | 30 | 31 | 32 | 33 | ▨ | 35 | 36 | 37 | 38 |
| 4 | 40 | 41 | 42 | 43 | 44 | 45 | 46 | 47 | 48 |
| 5 | 50 | 51 | 52 | 53 | 54 | 55 | 56 | 57 | ▨ |

Vnorm

FIG. 4B

ADDITION-AND-THINNING READING MODE

Hadd

|  | 0 |  | 1 |  | 2 |  |  |  |
|---|---|---|---|---|---|---|---|---|
|  | 00 | 01 | 02 | 04 | 05 | 06 | 07 | 08 |
| 0 | 00' | | 01' | | 02' | | | |
|  | 10 | 11 | 12 | 14 | 15 | 16 | 17 | 18 |
|  | 20 | 21 | 22 | 23 | 24 | 25 | 26 | 27 | 28 |
|  | 30 | 31 | 32 | 34 | 35 | 36 | 37 | 38 |
| 1 | 10' | | 11' | | 12' | | | |
|  | 40 | 41 | 42 | 44 | 45 | 46 | 47 | 48 |
|  | 50 | 51 | 52 | 53 | 54 | 55 | 56 | 57 | 58 |

Vadd

FIG. 5

IMAGE-PICKUP DEVICE, AND DEVICE AND METHOD FOR CORRECTING DEFECTIVE PIXEL

CROSS-REFERENCE TO RELATED APPLICATIONS

The present application claims priority from Japanese Patent Application No. JP 2005-237905 filed on Aug. 18, 2005, the entire disclosure of which is hereby incorporated by reference herein.

BACKGROUND OF THE INVENTION

The present invention relates to an image-pickup device which picks up an image by using a solid-image pickup element, a defective-pixel-correction device provided in the image-pickup device, and a defective-pixel correction method, and particularly relates to an image-pickup device using a solid-image pickup element which can select a reading mode wherein signals of a plurality of pixels area added to one another, a defective-pixel-correction device provided in the image-pickup device, and another defective-pixel correction method.

Usually, a solid-image-pickup element installed in a digital-still camera, a digital-video camera, and so forth often includes a defective pixel which occurs by various causes including the occurrence of a dark current, a photodiode abnormality, and so forth. The defective pixel outputs a signal on an abnormal level. In the past, therefore, a known image-pickup device corrects an output signal of the defective pixel according to the defect degree, so as to prevent the quality of an image from being deteriorated. For example, the known image-pickup device detects information about the position of the defective pixel and the defect degree and stores the information into a memory. When photographing is performed, the known image-pickup device interpolates the defective-pixel signal by using signals of pixels provided around the defective pixel on the basis of the stored information.

In recent years, the number of pixels provided in image-pickup elements has been on the increase. However, there has been a demand for decreasing a drive frequency of the image-pickup element as much as possible. Further, there has been a demand for picking up an image with a screen rate higher than in an ordinary case, as an additional function of the image-pickup device. Due to the above-described demands, there have been methods including a method for adding signals of the plurality of pixels corresponding to filters of the same color to one another on a circuit of the image-pickup element, the same-color filters being provided on the image-pickup element, and reading the added signals, and a method for thinning out part of the pixels and reading the pixel signals. Further, in recent years, the use of XY-scan image sensors including a complementary-metal-oxide-semiconductor (CMOS) image sensor or the like is on the increase, where the XY-scan image sensors is configured, so as to easily perform the above-described reading methods.

Here, defective-pixel detection and correction performed by an image-pickup device having the above-described image-pickup element wherein pixels are added and/or thinned out will be described. If the above-described pixel addition and/or the above-described pixel thinning is performed while the defective pixel is detected, and the defective pixel is corrected by using information about the detected defective pixel, the same pixel addition and pixel thinning as those performed when the defective pixel is detected should be performed. However, if an image-pickup device can switch between modes, so as to determine whether or not the pixel addition and/or the pixel thinning should be performed, and switch among pixel-addition methods and pixel-thinning methods that are performed according to a plurality of reading patterns, and if the image-pickup device detects a defective pixel in only one reading state, it becomes difficult to achieve the same reading state as that when the defective pixel is detected while the defective correction is performed. In that case, the address of the defective pixel, the address having been stored when the defective pixel is detected, does not correspond to the arrangement of pixels provided on the image-pickup element when the defective pixel is corrected. Subsequently, it becomes difficult to correct the defective pixel in an appropriate manner.

Further, there is a known technology relating to the present invention, where the technology achieves an image-pickup device including an image-pickup element so that an image signal inverted vertically and/or laterally is output from the image-pickup element. In the above-described image-pickup device, it is determined whether or not the image signal is inverted vertically and/or laterally during a defective pixel is corrected. Then, the address of defective-pixel information stored in a memory is converted according to the determination result, and the defective pixel is corrected by using the converted defective-pixel information. The above-described technology is disclosed in Japanese Unexamined Patent Application Publication No. 2003-163842 (refer to paragraphs [0016] to [0019] and FIG. 3).

As has been described, where a defective pixel is detected only in a single reading pattern in an image-pickup device that can select patterns of reading a pixel signal from an image-pickup element, it is difficult to correct the defective pixel on the basis of image signals obtained according to all of the reading patterns by using the detection result, as it is. Thus, the known image-pickup device has no function of selecting a reading pattern, so that the reading state corresponding to the time where the defective pixel is detected is not different from that corresponding to the time where the defective pixel is corrected. Therefore, the above-described problem does not occur. In the future, however, reading patterns wherein various methods for adding and/or thinning pixels are performed may be provided, so as to increase the number of pixels of the image-pickup element and/or generate an added value of the image-pickup element. Therefore, the above-described problem should be solved.

For solving the above-described problem, a defective pixel may be detected in every reading pattern and information about the detection result may be stored in a memory. Further, when the defective pixel is corrected, the defective-pixel information corresponding to a reading pattern selected at that time may be used. According to the above-described method, however, the detection-result memory requires record areas of the same number as that of selectable reading patterns, which increases the circuit size and the manufacturing cost. Further, the steps of detecting the defective pixel become complicated. For example, the defective-pixel detection is usually performed during the product shipment. According to the above-described method, the number of steps performed, so as to detect the defective pixel, increases and the manufacturing efficiency decreases.

SUMMARY OF THE INVENTION

Therefore, according to an embodiment of the present invention, there is provided an image-pickup device having a solid-image-pickup element. When a reading mode can be selected in which signals of a plurality of pixels are added in the solid-image pickup element, the signal of a defective pixel can be corrected in an appropriate manner without complicating defective-pixel detection steps and increasing the circuit size.

Further, according to another embodiment of the present invention, there is provided a device and a method for correcting the defective pixel, the device and method being achieved by using a solid-image pickup element that can select a reading mode wherein signals of a plurality of pixels are added. Subsequently, it becomes possible to correct a signal of the defective pixel at all times without complicating defective-pixel detection steps and increasing the circuit size.

Accordingly, an image-pickup device according to an embodiment of the present invention includes a solid-image-pickup element operable to select a plurality of reading modes including an ordinary mode wherein signals of all of a plurality of pixels are read in sequence and at least one pixel-addition mode wherein signals of the plurality of pixels corresponding to filters of the same color are added to one another and output; a defective-information-storage unit operable to store position information of a defective pixel on the solid-image-pickup element, where the defective pixel is detected when the ordinary mode is selected; a signal-correction unit operable to correct a pixel signal of at least one picked-up-image signal obtained by the solid-image-pickup element based on the position information stored in the defective-information storage unit, where the pixel signal corresponds to the position information; and a position-information conversion unit operable to convert the stored position information when the pixel-addition mode is selected so that the converted position information agrees with information about an arrangement of pixels, the pixel-arrangement information corresponding to the picked-up-image signal generated in the pixel-addition mode, and that transmits the converted position information to the signal-correction unit.

In the above-described image-pickup device, only the position information of the defective pixel on the solid-image pickup element is stored in the defective-information-storage unit, where the defective pixel is detected when the ordinary mode is selected. Then, the stored position information is used by the signal-correction unit when the defective-pixel signal is corrected. When the ordinary mode is selected, the signal-correction unit specifies the defective pixel by using the stored position information, as it is, and corrects the output signal corresponding to the defective pixel. Further, when the pixel-addition mode is selected, the stored position information is converted so that the converted position information agrees with the pixel-arrangement information obtained by the picked-up-image signal generated in the pixel-addition mode. Then, the converted position information is transmitted to the signal-correction unit. Subsequently, the signal-correction unit can perform signal correction in an appropriate manner in the pixel-addition mode.

When the pixel-addition mode is selected, the image-pickup device according to an embodiment of the present invention allows for converting the position information detected and stored when the ordinary mode is selected into information that agrees with the pixel-arrangement information obtained by the picked-up image signal generated in the pixel-addition mode, and for transmitting the converted position information to the signal-correction unit. Therefore, it becomes possible to perform the signal correction in an appropriate manner not only when the ordinary mode is selected, but also when the pixel-addition mode is selected. Further, since the defective pixel is detected only in the ordinary mode, the steps of detecting the defective pixel can be simplified. Further, it becomes possible to decrease the capacity of a memory storing defective information obtained by the defective-pixel detection and the circuit size.

DETAILED DESCRIPTION

Figure 1:
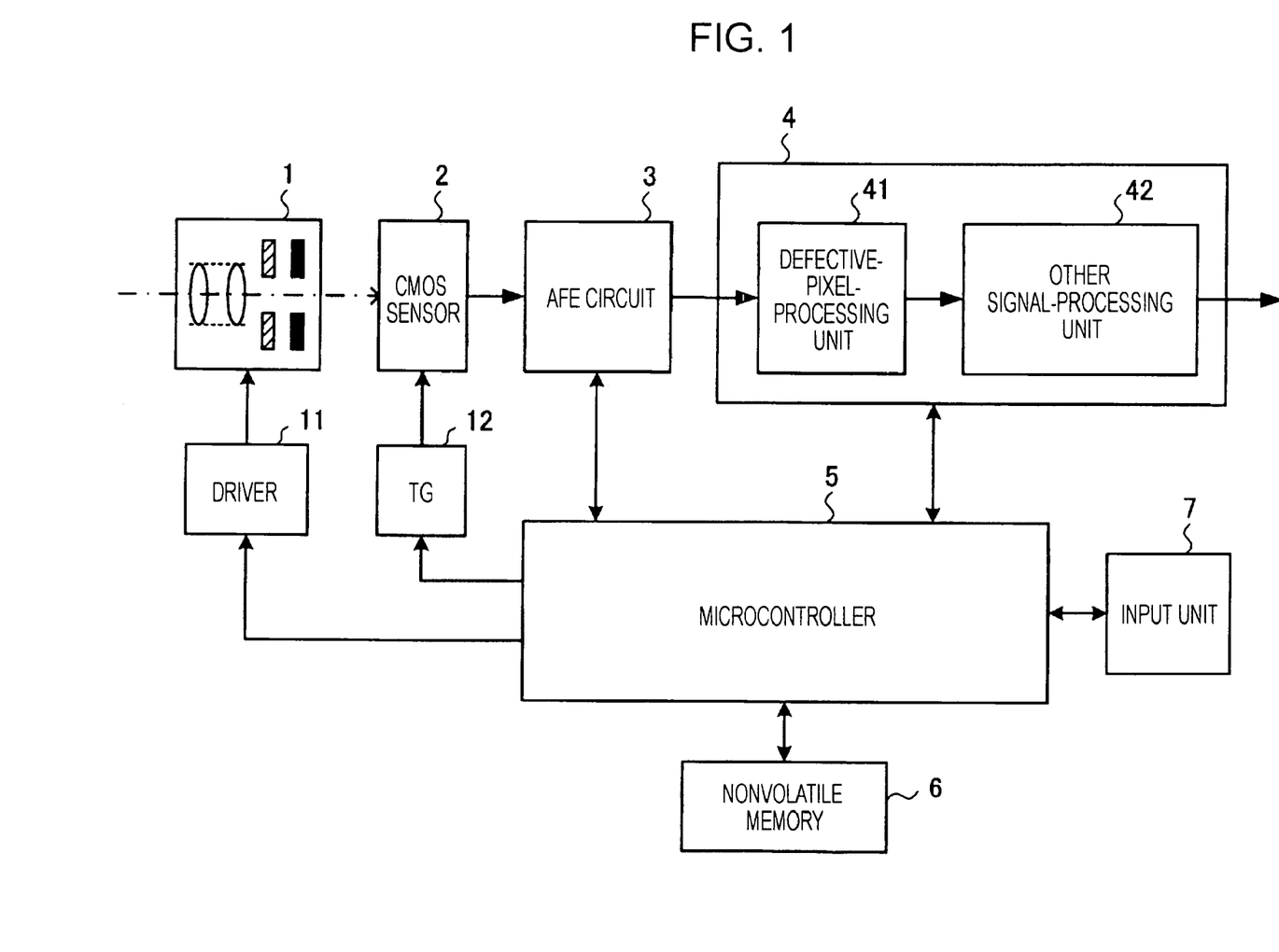
FIG. 1 is a block diagram showing main parts of an image-pickup device according to an embodiment of the present invention.

Hereinafter, embodiments of the present invention will be described in detail with reference to the attached drawings. FIG. 1 is a block diagram showing main parts of an image-pickup device according to an embodiment of the present invention. The image-pickup device shown in FIG. 1 includes an optical block 1, a CMOS image sensor (hereinafter simply referred to as a CMOS sensor) 2, an analog-front-end (AFE) circuit 3, a camera-signal processing circuit 4, a microcontroller 5, a nonvolatile memory 6, and an input unit 7. The image-pickup device further includes a driver 11 which controls operations of the inner workings of the optical block 1 and a timing generator (TG) 12 which controls driving of the CMOS sensor 2.

The optical block 1 includes a lens which converges light from a subject onto the CMOS sensor 2, a driving mechanism used for moving the lens, so as to perform focusing and/or zooming, a shutter mechanism, an iris mechanism, and so forth. The driver 11 controls driving of each of the mechanisms provided in the optical block 1 on the basis of a control signal transmitted from the microcontroller 5.

The CMOS sensor 2 includes a plurality of pixels arranged on a CMOS substrate in two-dimensional manner, where each of pixels includes a photodiode (photo gate), a transfer gate (shutter transistor), a switching transistor (address transistor), an amplifier transistor, a reset transistor (reset gate), and so forth. Further, a vertical-scan circuit, a horizontal-scan circuit, an image-signal output circuit, and so forth are provided. The CMOS sensor 2 is driven on the basis of a timing signal transmitted from the TG 12 so that the CMOS sensor 2 converts incident light from a subject into an electric signal. The TG 12 transmits a timing signal under the control of the microcontroller 5.

The CMOS sensor 2 has a function of adding signals of the pixels corresponding to filters of the same color to one another and reading the pixel signals at the same time, and a function of thinning out the pixels and reading the pixel signals. The above-described functions allow the CMOS sensor 2 to output an image signal at an image rate faster than in an ordinary case without increasing a synchronization frequency used for reading the pixel signal. Further, the above-described embodiment allows for switching between reading mode wherein pixel addition and pixel thinning are performed (hereinafter referred to as an addition-and-thinning reading mode) and ordinary mode wherein the above-described addition and thinning are not performed according to settings made by a user, and performing either the addition-and-thinning reading mode or the ordinary mode. Further, it may be switched among a plurality of reading modes wherein the above-described pixel addition and pixel thinning are performed. Further, a charge-coupled device (CCD) or the like may be used in place of the CMOS sensor 2, as an image-pickup element.

The AFE circuit 3 is configured, as a single integrated circuit (IC), for example. The AFE circuit 3 performs sample holding for an image signal output from the CMOS sensor 2 through correlated-double-sampling (CDS) processing, so as to maintain an appropriate signal-to-noise (S/N) ratio. Further, the AFE circuit 3 controls a gain by performing auto-gain-control (AGC) processing, performs analog-to-digital (A/D) conversion, and outputs a digital-image signal. A circuit performing the CDS processing may be provided on the same substrate as that of the CMOS sensor 2.

The camera-signal-processing circuit 4 is configured, as a single IC, for example. The camera-signal-processing circuit 4 executes part of or the entire various types of camera-signal processing performed for an image signal transmitted from the AFE circuit 3 and/or detection-and-calculation processing performed, so as to control the camera-signal processing, where the camera-signal processing includes autofocus (AF), autoexposure (AE), white-balance adjustment, gamma correction, and so forth. Particularly, in the above-described embodiment, the camera-signal-processing circuit 4 includes a defective-pixel-processing unit 41 which detects and/or corrects a defective pixel. While photographing is performed, an image signal obtained through the above-described defective-pixel correction performed by the defective-pixel-processing unit 41 is transmitted to the signal-processing unit 42 provided at the subsequent post, where the signal-processing unit 42 includes processing blocks which perform the above-described AF processing, AE processing, and so forth.

The microcontroller 5 includes a central processing unit (CPU), a read-only memory (ROM), a random-access memory (RAM), and so forth, for example. The microcontroller 5 controls parts of the image-pickup device in a centralized manner by executing a program stored in the ROM or the like. Further, the microcontroller 5 is connected to the nonvolatile memory 6 including an electrically-erasable-programmable ROM (EEPROM) or the like, for example. According to the above-described example, the nonvolatile memory 6 particularly stores information about the defective pixel (defective-pixel information) detected by the defective-pixel-processing unit 41.

The input unit 7 includes at least one operation key, a dial, a lever, and so forth that are provided, so as to receive an operation input transmitted from the user. The input unit 7 outputs the control signal corresponding to the operation input to the microcontroller 5. The input unit 7 includes at least one operation key or the like, so as to turn the power on and/or off, and select the above-described reading mode in the CMOS sensor 2.

In the above-described image-pickup device, signals obtained by photoelectrically converting light beams received by the CMOS sensor 2 are transmitted to the AFE circuit 3 in sequence. Each of the signals is subjected to the CDS processing and/or the AGD processing, and converted into a digital signal. The camera-signal-processing circuit 4 performs image-quality-correction processing for the digital-image signal transmitted from the AFE circuit 3. Then, the digital signal is converted into a brightness signal (Y) and a color-difference signal (C), and the brightness signal (Y) and the color-difference signal (C) are output.

Image data output from the camera-signal-processing circuit 4 is transmitted to a graphic interface (I/F) (not shown) and converted into an image signal for display, so that a camera-through image is displayed on a display unit including a liquid-crystal display (LCD) or the like. Further, when the user operates the input unit 7, so that the microcontroller 5 is instructed to record information about an image, the image data transmitted from the camera-signal-processing circuit 4 is transmitted to an encoder (not shown), subjected to predetermined compression-encoding processing, and recorded onto a recording medium (not shown) While a still image is recorded, the camera-signal-processing circuit 4 transmits the image data corresponding to a single frame to the encoder. While video is recorded, image-data items processed by the camera-signal-processing circuit 4 are transmitted to the encoder in sequence.

Next, operations performed in the image-pickup device will be described, the operations being performed, so as to detect and correct a defective pixel. In the image-pickup device, the defective-pixel-processing unit 41 of the camera-signal-processing circuit 4 detects and/or corrects the defective pixel included in the CMOS sensor 2. The defective pixel is detected, for example, when the image-pickup device is shipped from a factory. Information about the defective pixel detected during the shipment is stored in the nonvolatile memory 6 via the microcontroller 5. The defective-pixel information includes information indicating the deficiency state, namely, the defective-pixel address, the defect level, and so forth. While photographing is actually performed, namely, when the power is turned on, for example, the defective-pixel-processing unit 41 reads the defective-pixel information from the nonvolatile memory 6. Then, the defective-pixel-processing unit 41 interpolates the signal corresponding to filters of the same color, the filters being provided around the defective pixel, for the defective-pixel signal on the basis of the read defective-pixel information. Subsequently, the defective-pixel signal is corrected.

According to the above-described embodiment, the defective pixel is detected while only one reading mode is selected, and the detection result is recorded, as the defective-pixel information. For example, the defective pixel is detected in the ordinary reading mode wherein neither pixel addition nor pixel thinning is performed. On the other hand, if the same reading mode as that selected when the defective pixel was detected is selected while the defective pixel is corrected, the correction is performed on the basis of the recorded defective-pixel information. However, if a reading mode different from that selected during the defective-pixel detection is selected, the address of the defective pixel is changed according to the reading mode and the defective pixel is corrected on the basis of the changed address information. Thus, the defective-pixel processing unit 41 has the address-change function.

Figure 2:
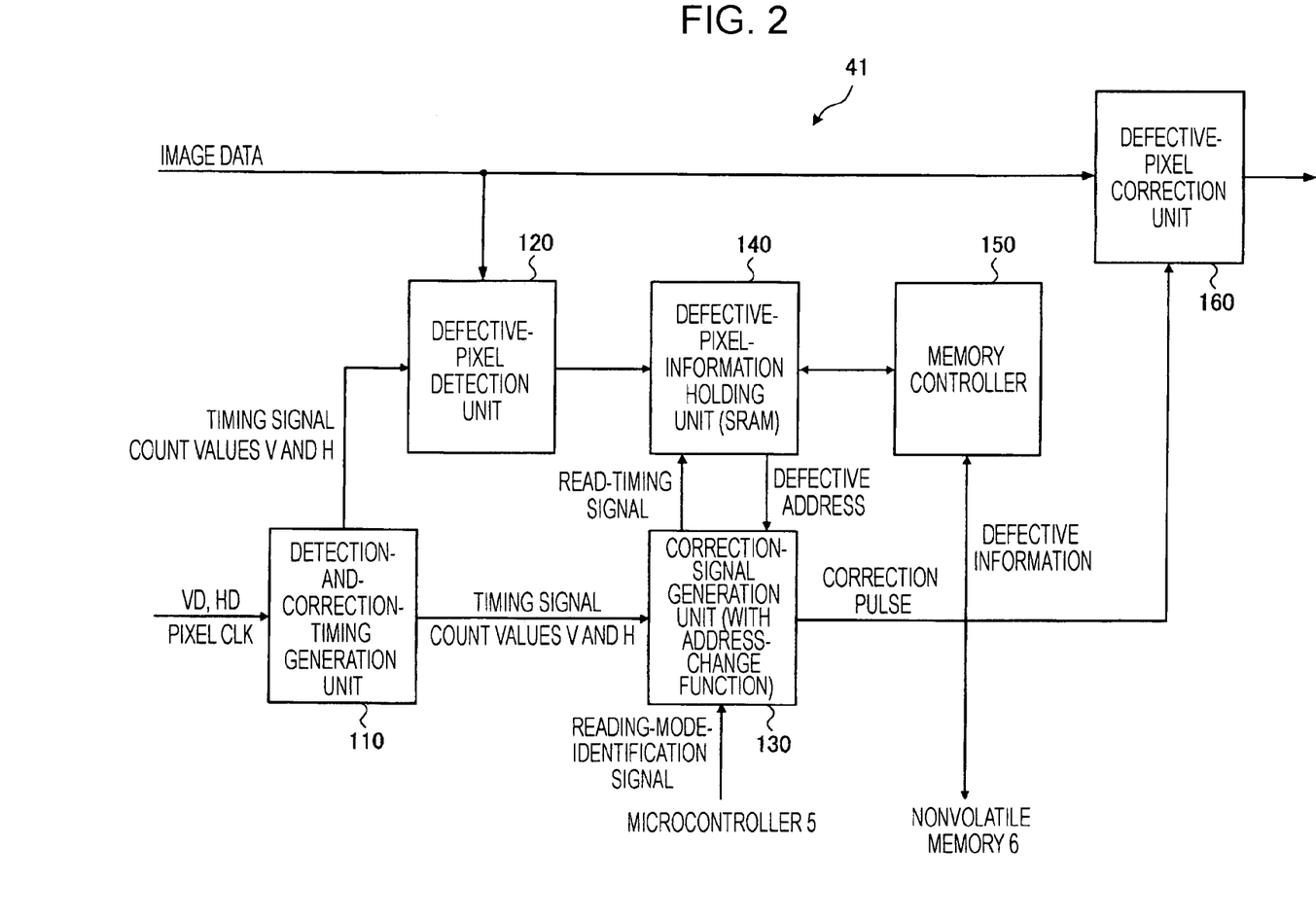
FIG. 2 is a block diagram showing the configuration of a defective-pixel-processing unit.

FIG. 2 is a block diagram showing the configuration of the defective-pixel-processing unit 41. As shown in FIG. 2, the defective-pixel-processing unit 41 includes a detection-and-correction-timing generation unit 110, a defective-pixel-detection unit 120, a correction-signal-generation unit 130, a defective-pixel-information holding unit 140, a memory controller 150, and a defective-pixel-correction unit 160.

The detection-and-correction-timing generation unit 110 outputs a timing signal indicating the operation time where the defective pixel is detected and/or corrected to the defective-pixel-detection unit 120 and the correction-signal-generation unit 130. More specifically, the detection-and-correction-timing generation unit 110 outputs a timing signal indicating the time where detection-and-correction operations are valid on the basis of a pixel-clock signal, a vertical-synchronization signal (VD), and a horizontal-synchronization signal (HD) that are synchronized with the image signal input from the AFE circuit 3 and information about count values indicating the number of pixels provided in the horizontal direction and the vertical direction.

The defective-pixel-detection unit 120 detects the defective pixel from the image signal input from the AFE circuit 3 on the basis of the timing signal transmitted from the detection-and-correction-timing generation unit 110. When a black defect is detected, for example, the pixel corresponding to the black defect is determined to be a defective pixel when the level of an input-image signal is lower than a predetermined threshold value, and information about a count value, the count value information being transmitted from the detection-and-correction-timing generation unit 110, is stored in the defective-pixel-information-holding unit 140, as the address of the defective pixel (defective address). Further, when a white defect is detected, the pixel corresponding to the white defect is determined to be a defective pixel when the level of an input-image signal is higher than a predetermined threshold value, and information about the defective address is stored in the defective-pixel-information-holding unit 140, as is the case with the black defect. Further, when the defective-pixel determination is performed, information about the difference between the threshold value and the above-described level may be stored in the defective-pixel-information-storing unit 140, as information indicating the magnitude of the defect.

The correction-signal-generation unit 130 reads the defective-address information from the defective-pixel-information holding unit 140 on the basis of the timing signal transmitted from the detection-and-correction-timing generation unit 110 and outputs a correction pulse indicating the time where the defective pixel is corrected to the defective-pixel-correction unit 160. The correction-signal-generation unit 130 outputs a read-timing signal controlling the defective-address reading to the defective-pixel-information holding unit 140 on the basis of the timing signal transmitted from the detection-and-correction-timing generation unit 110 and reads the defective-address information items that had been held in increasing order. Then, the correction-signal-generation unit 130 compares the read defective-address information item with the count-value information transmitted from the detection-and-correction-timing generation unit 110. When the defective-address information item agrees with the count-value information, the correction-signal-generation unit 130 determines that it is the time where the defective pixel should be corrected, and outputs the correction pulse.

Further, the correction-signal-generation unit 130 receives an identification signal transmitted from the microcontroller 5, the identification signal being generated, so as to identify the reading mode. If the addition-and-thinning reading mode is selected, the correction-signal-generation unit 130 converts the defective-address information read from the defective-pixel-information holding unit 140 according to the reading pattern, compares the converted address with the count value transmitted from the detection-and-correction-timing generation unit 110, and outputs the correction pulse. Subsequently, it becomes possible to perform appropriate defective-pixel correction by using the defective-address information detected in a single predetermined reading mode while photographing is performed in a reading mode different from the single predetermined reading mode.

The defective-pixel-information holding unit 140 includes a nonvolatile memory such as a static RAM (SRAM). The defective-pixel-information holding unit 140 temporarily stores the defective-pixel information detected by the defective-pixel detection unit 120. If the power is shut down after that, for example, the defective-pixel-information holding unit 140 transfers the stored information to the nonvolatile memory 6 via the memory controller 150 and the microcontroller 5. Further, while photographing is performed, the defective-pixel-information holding unit 140 reads the defective-pixel information stored in the nonvolatile memory 6 and outputs the defective-address information to the correction-signal-generation unit 130.

The memory controller 150 controls a read operation and a write operation performed by the defective-pixel-information holding unit 140. The memory controller 150 has control functions, so as to transfer the defective-pixel information stored in the defective-pixel-information holding unit 140 to the nonvolatile memory 6, read the defective-pixel information from the nonvolatile memory 6, transmit the read defective-pixel information to the defective-pixel-information holding unit 140, and control access from the defective-pixel detection unit 120 and/or the correction-signal generation unit 130 to the defective-pixel-information holding unit 140.

The defective-pixel correction unit 160 receives the input-image signal transmitted from the AFE circuit 3. When the correction-signal generation unit 130 outputs the correction pulse, the defective-pixel correction unit 160 substitutes a predetermined signal for a signal of the current pixel, where the predetermined signal is interpolated by using signals of the pixels corresponding to the same-color filters provided around the current pixel. When the above-described interpolation is performed, the information about the defect level or the like, the information being stored in the defective-pixel-information holding unit 140, may be used and the processing corresponding to the information may be performed. The above-described processing allows for correcting and outputting a defective-pixel signal of the input-image signal to a signal-processing block (the other signal-processing unit 42) provided at the subsequent stage.

Basically, a defective pixel is detected by the defective-pixel processing unit 41 when the image-pickup device is shipped from a factory. At that step, the ordinary-reading mode is selected, and an image signal obtained by picking up an image of a predetermined subject (an entirely black subject, an entirely white subject, and so forth) is input to the defective-pixel detection unit 120 and the defective pixel is detected. Information about the detected defective pixel is temporarily stored in the defective-pixel-information holding unit 140. After the detection is finished, for example, when the power is shut down, the defective-pixel information stored in the defective-pixel-information holding unit 140 is written into the nonvolatile memory 6.

After that, when the user performs photographing, the defective-pixel-information holding unit 140 reads the defective-pixel information stored in the nonvolatile memory 6 when the power is turned on, for example. Then, the correction-signal generation unit 130 outputs the correction pulse by using the defective-pixel information and the defective-pixel correction unit 160 performs the signal correction.

The defective-pixel detection unit 120 may detect a defective pixel after the shipment, for example, when the power is turned on and/or photographing is performed so that a so-called post-growing defect can be detected. In that case, information about the detected post-growing defect is further stored in the defective-pixel-information holding unit 140 and the information stored in the defective-pixel-information holding unit 140 is updated. Otherwise, a purpose-built storage unit (a flip-flop circuit or the like) which stores postgrowing-defect information may be provided. Namely, if the defective pixel corresponding to no address information that had already been stored is detected, as the post-growing defect, the address information thereof or the like may be temporarily stored in the purpose-built storage unit and used when the post-growing defective pixel is corrected.

Next, operations performed, so as to detect and correct a defective pixel where the addition-and-thinning reading mode is selected will be described. Further, operations performed, so as to detect and correct the defective pixel where the ordinary reading mode is selected will be described. In the following description, image-pickup elements (the CMOS sensors 2) corresponding to filter components R, G, and B are provided, for the sake of simplicity. In the following description, the above-described defective-pixel detection and defective-pixel correction are performed for a signal output from one of the above-described image-pickup elements. Actually, however, the above-described defective-pixel detection and defective-pixel correction are performed for each of the image signals corresponding to the filter components.

Figure 3A:
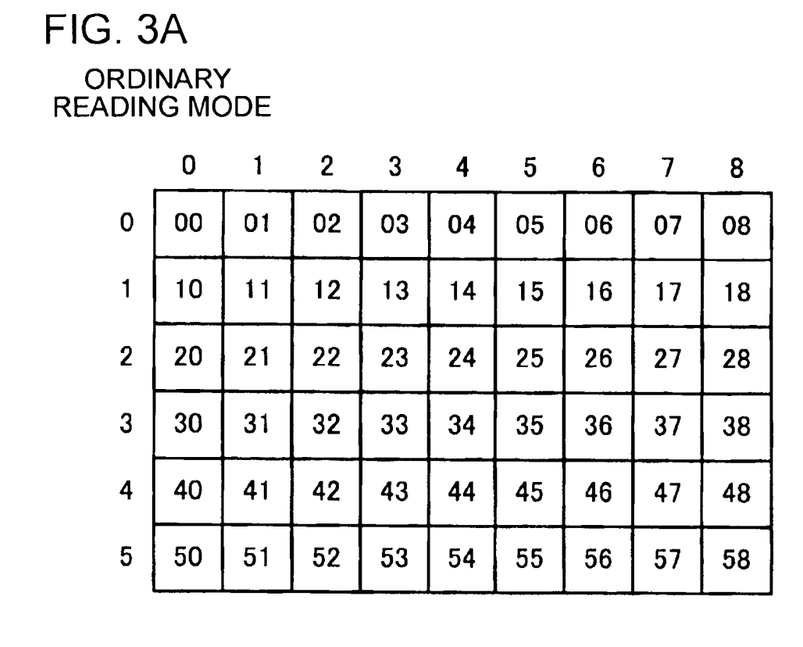
FIG. 3A shows an example reading mode and an example arrangement of pixels of an image-pickup element.
Figure 3B:
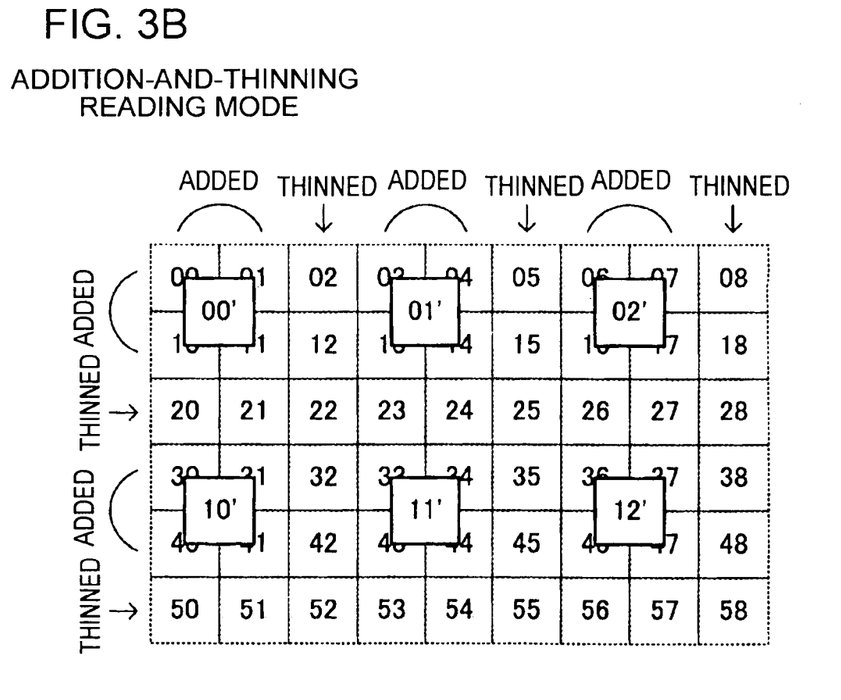
FIG. 3B shows another example reading mode and another example arrangement of pixels of the image-pickup element.

Each of FIGS. 3A and 3B shows an example arrangement of pixels of the image-pickup element and an example reading mode. For example, FIG. 3A shows an image-pickup element including pixels arranged in six lines by nine columns, where the six lines overlap with one another in the vertical direction and the nine columns overlap with one another in the horizontal direction. In the image-pickup element, pixel scanning is started from the upper-left side of the drawing. Further, from the upper-left side of the drawing, addresses 0, 1, 2, . . . , and so forth are assigned in sequence in each of the horizontal direction and the vertical direction. In the following description, where the address 0 is assigned to a pixel in each of the vertical direction and the horizontal direction, the pixel is referred to as pixel (00). Further, where the address "0" and the address "1" are assigned to another pixel in the vertical direction and the horizontal direction, respectively, the pixel is referred to as pixel (01). When the ordinary reading mode is selected, the image-pickup element having pixels arranged in the above-described manner outputs signals of all of the pixels in sequence, where the pixels include pixel (00), pixel (01), pixel (02), . . . , pixel (08), pixel (10), pixel (11), . . . , pixel (18), pixel (20), and so forth.

FIG. 3B shows an example reading method performed by the image-pickup element having the pixels arranged in the above-described manner where the addition-and-thinning reading mode is selected. According to the example reading method, two adjacent lines by two adjacent columns of pixels are added to one another and output, as the signal of a single pixel. Further, signals of a single line by single column of pixels provided around a group of the added pixels are thinned out. For example, four pixels (00), (01), (10), and (11) are added to one another and output, as pixel (00'), four pixels (03), (04), (13), and (14) are added to one another and output, as pixel (01'), and four pixels (06), (07), (16), and (17) are added to one another and output, as pixel (02'). Further, on the second line, signals of pixels (10'), (11'), and (12') are output in that order. According to the above-described reading pattern, the resolution of an output image (the pixel number) is reduced to one ninth an original resolution. Subsequently, if the same screen-image rate as an original screen-image rate is used, it becomes possible to decrease a frequency used for reading pixel signals output from the image-pickup element. On the other hand, if the same read frequency as an original read frequency is used, the screen-image rate can be increased by nine times.

Figure 4A:
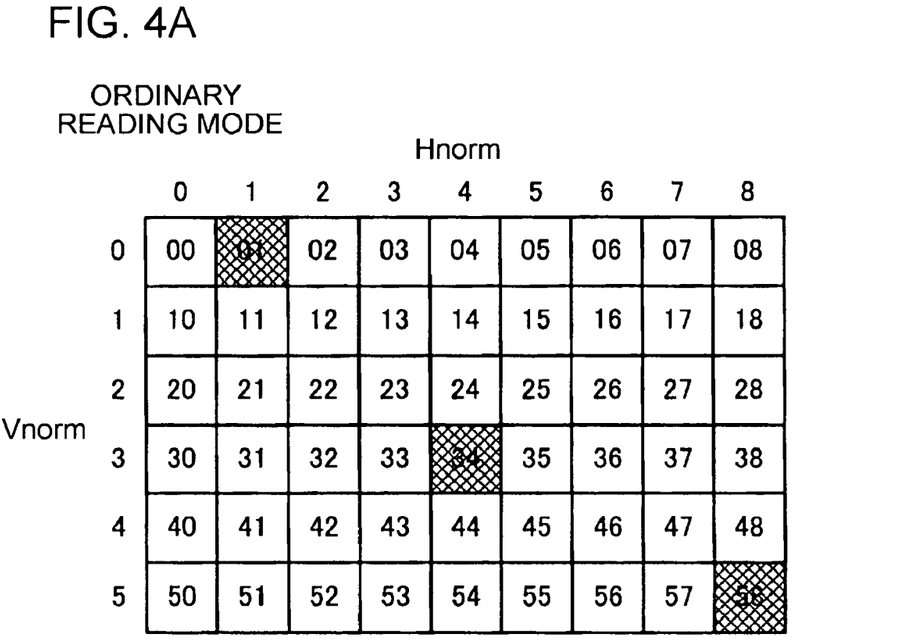
FIG. 4A illustrates defective pixels occurring in the reading mode shown in FIG. 3A.
Figure 4B:
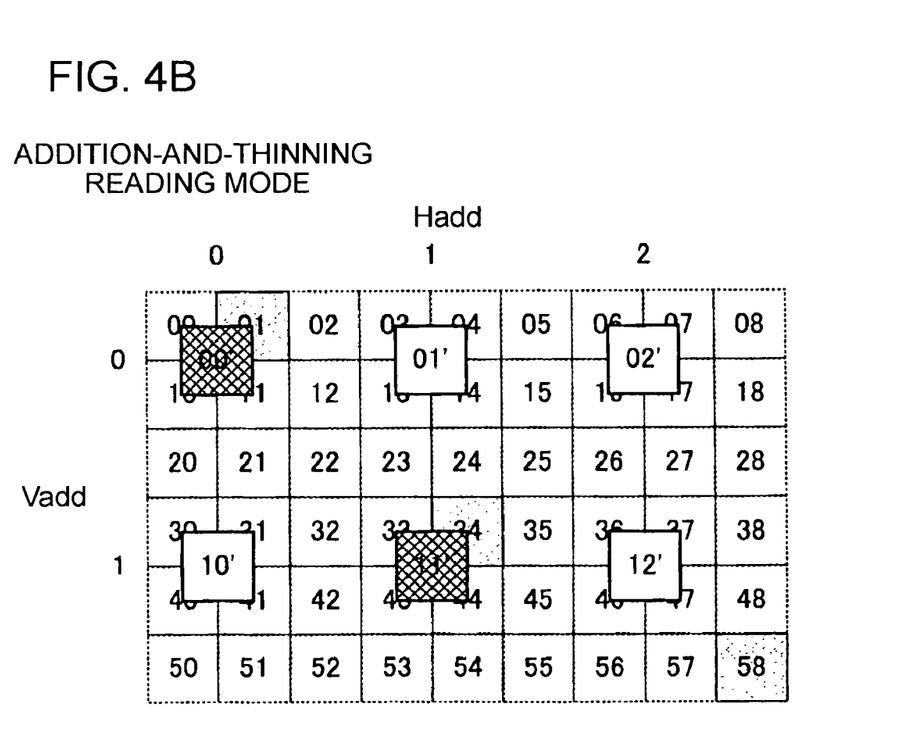
FIG. 4B illustrates defective pixels occurring in the reading mode shown in FIG. 3B.

FIGS. 4A and 4B illustrate defective pixels which occur in the above-described reading modes. In FIG. 4A, pixel (01), pixel (34), and pixel (58) are detected, as defective pixels, and information about the addresses thereof is stored, as defective-pixel information through a detection operation performed in the ordinary reading mode, for example. Here, in the addition-and-thinning reading mode, if at least one of pixels of which signals are added to one another is determined to be a defective pixel, the added pixels are also determined to be defective pixels. In that case, pixel (01) is determined to be the defective pixel, for example, as shown in FIG. 4B. Subsequently, pixel (00') to which pixel (01) is added is also determined to be the defective pixel. Similarly, pixel (11') is determined to be the defective pixel. Further, since pixel (58) is thinned out in the addition-and-thinning reading mode, pixel (58) does not appear, as the defective pixel.

If the ordinary reading mode is selected while photographing is performed, signals of the defective pixels may be corrected by determining the positions of the defective pixels by using address information of the above-described defective pixels, as it is. However, in a reading mode different from that selected when the defective pixels were detected, the pixel arrangement of the different reading mode becomes different from that used in the reading mode selected when the defective pixel were detected. Therefore, it is difficult to correct the defective pixels by using the defective-address information, as it is, the defective-address information being obtained when the defective pixels were detected. Namely, the defective-address information obtained when the defective-pixels were detected should be changed according to the pixel arrangement used in the selected reading mode.

When the ordinary reading mode is selected, the address in the horizontal direction of an image signal input to the defective-pixel-processing unit 41 is shown, as Hnorm. Further, the address in the vertical direction of the input image signal is shown, as Vnorm. Further, when the addition-and-thinning reading mode is selected, the address in the horizontal direction of an image signal input to the defective-pixel-processing unit 41 is shown, as Hadd, and the address in the vertical direction of the input image signal is shown, as Vadd. In the following description, the horizontal-direction address and the vertical-direction address of a defective pixel which occurs in the ordinary-reading mode are determined to be Hnormx and Vnormx, and Expressions (1), (2), (3), and (4) hold, as below.

$$Hnormx = Hadd \times 3 \qquad \text{Expression (1)}$$

$$Hnormx = Hadd \times 3 + 1 \qquad \text{Expression (2)}$$

$$Vnormx = Vadd \times 3 \qquad \text{Expression (3)}$$

$$Vnormx = Vadd \times 3 + 1 \qquad \text{Expression (4)}$$

If the defective-address information read from the defective-pixel-information holding unit 140 satisfies either Expression (1) or Expression (2) and either Expression (3) or Expression (4) when the addition-and-thinning reading mode is selected, the correction-signal-generation unit 130 of the defective-pixel processing unit 41 outputs a correction pulse. Namely, it becomes possible to determine whether or not a defective address is included in a group of pixels added to one another on the basis of the above-described conditions. If the defective address is included in the pixel group, the pixel group is determined to be a defective pixel.

For example, when the correction-signal generation unit 130 reads the address information of pixel (34), as a defective address, the address information being represented by (Hnormx, Vnormx)=(4, 3), Expressions (2) and (3) are simultaneously satisfied at the time where the address (Hadd and Vadd) of a image signal input in the addition-and-thinning reading mode becomes (1, 1) (i.e., the time where information about pixel (11') is input). Therefore, the correction-signal generation unit 130 determines pixel (11') to be the defective pixel and outputs the correction pulse. Subsequently, the signal of pixel (11') is corrected by the defective-pixel correction unit 160.

Figure 5:
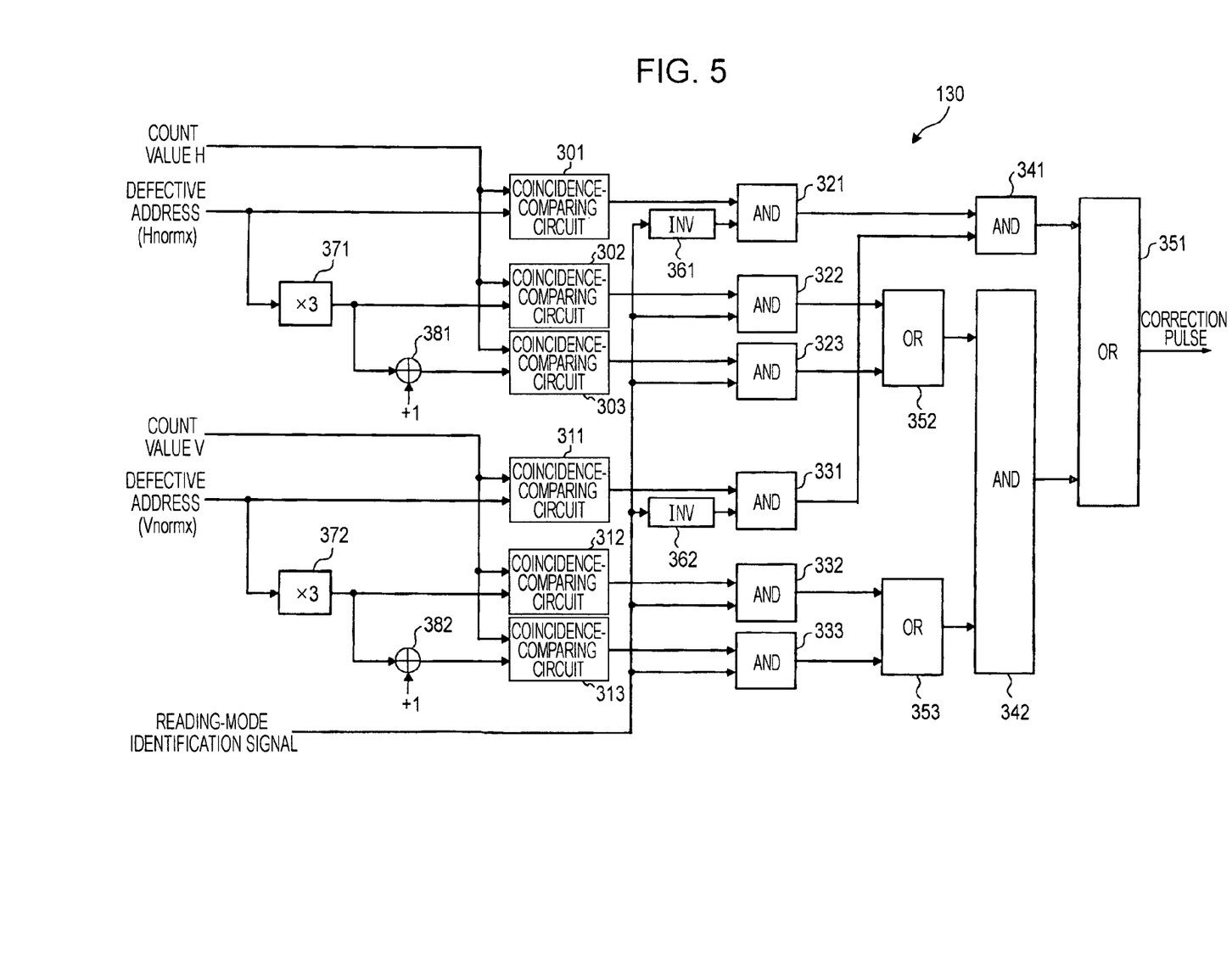
FIG. 5 illustrates an example circuit configuration of a correction-signal generation unit that can support each of the reading modes shown in FIGS. 3A and 3B.

FIG. 5 shows an example circuit configuration of the correction-signal generation unit 130 supporting each of the above-described reading modes. The correction-signal generation unit 130 shown in FIG. 5 includes coincidence-comparing circuits 301, 302, 303, 311, 312, and 313, AND circuits 321, 322, 323, 331, 332, 333, 341, and 342, OR circuits 351, 352, and 353, inverter circuits 361 and 362, multiplication circuits 371 and 372, and addition circuits 381 and 382.

When the ordinary-reading mode is selected in the correction-signal generation unit 130, the reading-mode identification signal transmitted from the microcontroller 5 attains level L. Operations of each of the AND circuits 321 and 331 receiving the L-level signal via the inverter circuits 361 and 362 become valid, and operations of each of the AND circuits 322, 323, 332, and 333 become invalid. At that time, the coincidence-comparing circuit 301 compares the horizontal-direction defective address Hnormx read from the defective-pixel-information holding unit 140 to the count value H transmitted from the detection-and-correction timing generation unit 110. If the above-described values agrees with each other, an output signal transmitted from the AND circuit 321 attains level H. Further, the coincidence-comparing circuit 311 compares the vertical-direction defective address Vnormx read from the defective-pixel-information holding unit 140 to the count value V transmitted from the detection-and-correction timing generation unit 110. When the above-described values agree with each other, a signal output from the AND circuit 331 attains the level H. If the input-image signal and the defective address agree with each other through the above-described operations, a signal output from the AND circuit 341 to the OR circuit 351 attains the level H and the OR circuit 351 outputs the correction pulse.

On the other hand, when the addition-and-thinning reading mode is selected, the reading-mode identification signal attains the level H and operations of the AND circuits 321 and 331 become invalid. Further, operations of the AND circuits 322, 323, 332, and 333 become valid. At that time, the multiplication circuit 371 multiplies the horizontal-direction defective address Hnormx read from the defective-pixel-information holding unit 140 by "3". Then, a value obtained by the multiplication is input to the coincidence-comparing circuit 302. Further, the addition circuit 381 adds "1" to the value obtained by the multiplication and information about a value obtained by the addition is input to the coincidence-comparing circuit 303. The coincidence-comparing circuits 302 and 303 compare the above-described input values and the count value H transmitted from the detection-and-correction timing generation unit 110. When the input values agree with the count value H, the coincidence-comparing circuits 302 and 303 output signals attaining the level H to the AND circuits 322 and 323. That is to say, the conditions of Expressions (1) and (2) are determined according to a line extending from the coincidence-comparing circuit 302 to the AND circuit 322 and a line extending from the coincidence-comparing circuit 303 to the AND circuit 323. If at least one of the conditions is fulfilled, a signal output from the OR circuit 352 to the AND circuit 342 attains the level H.

The above-described configuration can also be used for the vertical-direction defective address. Namely, the multiplication circuit 372 multiplies the vertical-direction defective address Vnormx read from the defective-pixel-information holding unit 140 by "3". Then, information about a value obtained by the multiplication is input to the coincidence-comparing circuit 312. Further, the addition circuit 382 adds "1" to the value obtained by the multiplication and information about a value obtained by the addition is input to the coincidence-comparing circuit 313. The coincidence-comparing circuits 312 and 313 compare the above-described input values and the count value V transmitted from the detection-and-correction timing generation unit 110. When the input values agree with the count value V, the coincidence-comparing circuits 312 and 313 output signals attaining the level H to the AND circuits 332 and 333. That is to say, the conditions of Expressions (2) and (4) are determined according to a line extending from the coincidence-comparing circuit 312 to the AND circuit 332 and a line extending from the coincidence-comparing circuit 313 to the AND circuit 333. If any of the conditions is fulfilled, a signal output from the OR circuit 353 to the AND circuit 342 attains the level H. Further, when both signals output from the OR circuits 352 and 353 attain the level H, a signal output from the AND circuit 342 to the OR circuit 351 attains the level H and the OR circuit 351 outputs the correction pulse.

When the addition-and-thinning reading mode is selected, where the reading pattern thereof is different from that used when the defective pixel is detected, the above-described correction-signal generation unit 130 converts the defective-address information read from the defective-pixel-information holding unit 140 so that the converted defective-address information corresponds to the pixel arrangement used in the selected reading mode. After that, the correction-signal generation unit 130 determines whether or not a signal of the defective pixel should be corrected. Therefore, it becomes possible to correct the defective-pixel signal in an appropriate manner each time. Further, information about the detection result obtained in only one reading mode (the ordinary reading mode in this embodiment) is held, as the defective-pixel information. Therefore, a recording area provided, so as to record the detection-result information, can be reduced. Further, the circuit size and the manufacturing cost can also be prevented from being increased. Further, since the defective pixel is detected only in a single reading mode, the steps of defective-pixel detection can be simplified and/or reduced. For example, when detecting a defective pixel during shipment, the detection step can be shortened and the manufacturing cost can be reduced.

Further, since the above-described circuits shown in FIG. 5 are configured, as hardware, it becomes possible to perform address-conversion operations with high speed. Namely, it becomes possible to reduce an operation delay such as a shutter-time lag between the time where a shutter button is pressed down and the time where a picked-up image is displayed and/or recorded. Further, it becomes possible to reduce processing load placed on the microcontroller 5 or the like during photographing.

Further, the conditions shown by using the above-described coefficients and expressions are determined according to how the addition and/or the thinning is performed while the pixel signal is read. For example, in the addition-and-thinning reading mode, signals of x pixels adjacent in the horizontal direction and those of y pixels adjacent in the vertical direction are added to one another and output, where the adjacent pixels correspond to the same-color filters. Here, each of the above-described signs x and y represents an integer equal to or larger than one. Further, m lines by n columns of pixels (each of the signs m and n represents an integer equal to or larger than zero) are provided, so as to be adjacent to the group of x pixels and y pixels in the horizontal direction and the vertical direction, and signals of the above-described m lines by n columns of pixels are thinned out. In that case, a coefficient by which the address Hadd is multiplied in the first term at the right side of each of Expressions (1) to (2) is determined to be (x+m). Further, a coefficient by which the address Vadd is multiplied in the first term at the right side of each of Expressions (3) to (4) is determined to be (y+n). Further, in the second terms at the right sides of the condition expressions, different numbers should be added by as many as the numbers of lines and columns included in the group of pixels that should be added to one another (i.e., by as many as x and y). For example, as for the horizontal-direction component, a predetermined number of condition expressions are provided, the predetermined number corresponding to the x pixels. In the first terms at the right sides of the condition expressions, additions "+0" (corresponding to Expression (1)), "+1", "+2", ..., and "+(x−1)" are performed for "Hadd× (x+m)". Similarly, as for the vertical-direction component, a predetermined number of condition expressions hold, the predetermined number corresponding to the y pixels. In the first terms at the right sides of the condition expressions, additions "+0" (corresponding to Expression (3)), "+1", "+2", ..., and "+(y−1)" are performed for "Vadd×(y+n)". Then, when any of the x condition expressions is satisfied and any of the y condition expressions is satisfied, it is determined that it is the time where the defective pixel should be corrected.

Thus, the addition and/or the thinning of pixels is performed under predetermined rules in ordinary cases. Therefore, the address conversion can be performed by using relatively simple condition expressions such as Expressions (1) to (4). Subsequently, the address-conversion function can be configured, as a relatively simple circuit including addition circuits, multiplication circuits, coincidence-comparing circuits, inverter circuits, various logic circuits, and so forth, as is the case with the circuit shown in FIG. 5. Further, every line of the circuits corresponding to the x condition expressions and that of the circuits corresponding to the y condition expressions are formed, and only a necessary line is selected according to a selectable reading pattern by using an AND circuit or the like provided at the subsequent stage, for example. Subsequently, the above-described circuit attains general versatility, so as to support various reading patterns.

The present invention can be used for an image-pickup device using a solid-image pickup element including a digital video camera, a digital still camera, and so forth. Further, the present invention can be used for a device and/or an apparatus including a mobile phone, a personal digital assistant (PDA), and so forth having the same imaging function as that of the above-described image-pickup device. The present invention can further be used for a device and/or an apparatus that can process and/or record an image-pickup signal obtained by a small camera used for a TV phone connected to a personal computer (PC) and/or game software installed on the PC, for example.

Further, the above-described defective-pixel detection function and/or the defective-pixel correction function can be achieved by a computer. In that case, a program storing information about details on processing of functions that should be provided in the device (the functions corresponding to part of or the entire defective-pixel processing unit 41) is provided. The computer executes the program so that the above-described functions are achieved on the computer. The program storing the processing information can be recorded onto a computer readable recording medium including a magnetic-recording device, an optical disk, a magneto-optical disk, a semiconductor memory, and so forth.

For distributing the above-described program, a transportable recording medium storing the program may be sold, where the transportable recording medium includes an optical disk, a semiconductor memory, and so forth. Further, the program may be stored in storage of a server computer so that the program can be transferred from the server computer to another computer via a network, for example.

The computer executing the program stores the program recorded onto the transportable recording medium, or the program transferred from the server computer in the storage thereof. Further, the computer reads the program from its storage and executes processing according to the program. Further, the computer can read the program directly from the transportable recording medium and execute processing according to the program. Still further, the computer can perform processing according to the program transmitted thereto every time the program is transferred from the server computer.

It should be understood by those skilled in the art that various modifications, combinations, sub-combinations and alterations may occur depending on design requirements and other factors insofar as they are within the scope of the appended claims or the equivalents thereof.

The invention claimed is:

1. An image-pickup device which picks up an image, the image-pickup device comprising:
a solid-image-pickup element operable to select a plurality of reading modes including an ordinary mode wherein signals of all of a plurality of pixels are read in sequence and at least one pixel-addition mode wherein signals of the plurality of pixels corresponding to filters of the same color are added to one another and output;
defective-information-storage means which stores position information of a defective pixel on the solid-image-pickup element, where the defective pixel is detected when the ordinary mode is selected;
signal-correction means which corrects a pixel signal of at least one picked-up-image signal obtained by the solid-image-pickup element based on the position information stored in the defective-information storage means, where the pixel signal corresponds to the position information; and
position-information conversion means that converts the stored position information when the pixel-addition mode is selected, so that the converted position information agrees with information about an arrangement of pixels, the pixel-arrangement information corresponding to the picked-up-image signal generated in the pixel-addition mode, and that transmits the converted position information to the signal-correction means.

2. The image-pickup device according to claim 1, wherein when at least one defective pixel detected based on the position information is included in a group of pixels provided in the solid-image-pickup element, the defective pixel occurring in the pixel arrangement corresponding to the picked-up-image signal obtained in the ordinary mode and the pixel group being read as a single pixel through addition performed when the pixel-addition mode is selected, the position-information-conversion means transmits information about a position of the pixel corresponding to the pixel group to the signal-correction means as the converted position information, the pixel-position information being obtained by using the picked-up-image signal generated in the pixel-addition mode.

3. The image-pickup device according to claim 1, wherein, in the pixel-addition mode, the solid-image pickup element adds signals of x adjacent pixels provided in a horizontal direction and y adjacent pixels provided in a vertical direction to one another and outputs the added signals, where the adjacent pixels correspond to filters of the same color and where each of x and y represents an integer equal to or larger than one,
- wherein the position-information-conversion means includes:
- a plurality of multiplication means that multiply a horizontal-direction component of the position information by x and that multiply a vertical-direction component of the position information by y;
- a plurality of addition means that add integers from 1 to (x−1) to values output from the multiplication means corresponding to the horizontal direction, respectively, and that add integers from 1 to (y−1) to values output from the multiplication means corresponding to the vertical direction, respectively; and
- logical-operation means which transmits information about a horizontal-direction address and a vertical-direction address to the signal-correction means as the converted position information when a value output from the multiplication means and/or any of the addition means corresponding to the horizontal-direction component agrees with the horizontal-direction address of the picked-up-image signal generated in the pixel-addition mode and a value output from the multiplication means and/or any of the addition means corresponding to the vertical-direction component agrees with the vertical-direction address of the picked-up-image signal generated in the pixel-addition mode.

4. The image-pickup device according to claim 1, wherein
- the solid-image-pickup element is operable to select an addition-and-thinning mode as the pixel-addition mode, so that signals of the adjacent pixels corresponding to the same-color filters are added to one another and read, and signals of pixels provided on either a predetermined number of lines or a predetermined number of columns, or both the predetermined number of lines and the predetermined number of columns are thinned out, where the lines and columns are adjacent to a group of the added pixels; and
- when at least one defective pixel detected based on the position information is included in the pixel group when the addition-and-thinning mode is selected, the defective pixel occurring in the pixel arrangement corresponding to the picked-up-image signal obtained in the ordinary mode, the position-information-conversion means transmits information about a position of the pixel corresponding to the pixel group to the signal-correction means as the converted position information, the pixel-position information being obtained by using the picked-up-image signal generated in the addition-and-thinning mode.

5. The image-pickup device according to claim 1, wherein the solid-image pickup element is operable to select an addition-and-thinning mode as the pixel-addition mode, so that signals of x adjacent pixels provided in a horizontal direction and y adjacent pixels provided in a vertical direction are added and output, where the adjacent pixels correspond to the same-color filters and where each of x and y represents an integer equal to or larger than one, and signals of pixels provided on m lines and n columns are thinned out, where the m lines and the n columns are adjacent to a group of the added pixels in the horizontal direction and the vertical direction, respectively, and where each of n and m is an integer equal to or larger than zero, and
- wherein the position-information-conversion means includes:
- a plurality of multiplication means that multiply a horizontal-direction component of the position information by (x+m) and that multiply a vertical-direction component of the position information by (y+n);
- a plurality of addition means that add integers from 1 to (x−1) to values output from the multiplication means corresponding to the horizontal direction, respectively, and that add integers from 1 to (y−1) to values output from the multiplication means corresponding to the vertical direction, respectively; and
- logical-operation means which transmits information about a horizontal-direction address and a vertical-direction address to the signal-correction means as the converted position information when a value output from the multiplication means and/or any of the addition means corresponding to the horizontal-direction component agrees with the horizontal-direction address of the picked-up-image signal generated in the addition-and-thinning mode and a value output from the multiplication means and/or any of the addition means corresponding to the vertical-direction component agrees with the vertical-direction address of the picked-up-image signal generated in the addition-and-thinning mode.

6. The image-pickup device according to claim 1, further comprising defective-pixel-detection means which detects the defective pixel based on the picked-up-image signal obtained by the solid-image-pickup element and stores the position information of the defective pixel in the defective-information-storage means when the ordinary mode is selected.

7. The image-pickup device according to claim 1, further comprising selection-and-input means which receives information about an operation performed by a user so as to select the reading mode.

8. A defective-pixel-correction device which corrects an output signal of a defective pixel detected on a solid-image-pickup element upon receiving an input signal of an image picked up by the solid-image-pickup element which can select a plurality of reading modes including an ordinary mode wherein signals of all of a plurality of pixels are read in sequence and at least one pixel-addition mode wherein signals of the plurality of pixels corresponding to filters of the same color are added to one another and output, the defective-pixel-correction device comprising:
- defective-information-storage means which stores position information of a defective pixel on the solid-image-pickup element, where the defective pixel is detected when the ordinary mode is selected;
- signal-correction means which corrects a pixel signal of at least one picked-up-image signal obtained by the solid-image-pickup element based on the position information stored in the defective-information storage means, where the pixel signal corresponds to the position information; and
- position-information conversion means that converts the stored position information when the pixel-addition mode is selected, so that the converted position information agrees with information about an arrangement of pixels, the pixel-arrangement information corresponding to the picked-up-image signal generated in the pixel-addition mode, and that transmits the converted position information to the signal-correction means.

9. A defective-pixel-correction method which corrects an output signal of a defective pixel detected on a solid-image-pickup element upon receiving an input signal of an image picked up by the solid-image-pickup element which can select a plurality of reading modes including an ordinary mode wherein signals of all of a plurality of pixels are read in sequence and at least one pixel-addition mode wherein signals of the plurality of pixels corresponding to filters of the same color are added to one another and output, the defective-pixel-correction method comprising:

storing position information of the defective pixel detected on the solid-image-pickup element when the ordinary mode is selected;

correcting a pixel signal of at least one picked-up-image signal obtained by the solid-image-pickup element based on the stored position information, where the pixel signal corresponds to the position information and the correction step is performed by signal-correction means; and converting the stored position information when the pixel-addition mode is selected so that the converted position information agrees with information about an arrangement of pixels, the pixel-arrangement information corresponding to the picked-up-image signal generated in the pixel-addition mode, and transmitting the converted position information to the signal-correction means.

10. An image-pickup device which picks up an image, the image-pickup device comprising:

a solid-image-pickup element operable to select a plurality of reading modes including an ordinary mode wherein signals of all of a plurality of pixels are read in sequence and at least one pixel-addition mode wherein signals of the plurality of pixels corresponding to filters of the same color are added to one another and output;

a defective-information-storage unit operable to store position information of a defective pixel on the solid-image-pickup element, where the defective pixel is detected when the ordinary mode is selected;

a signal-correction unit operable to correct a pixel signal of at least one picked-up-image signal obtained by the solid-image-pickup element based on the position information stored in the defective-information storage unit, where the pixel signal corresponds to the position information; and a position-information conversion unit operable to convert the stored position information when the pixel-addition mode is selected so that the converted position information agrees with information about an arrangement of pixels, the pixel-arrangement information corresponding to the picked-up-image signal generated in the pixel-addition mode, and that transmits the converted position information to the signal-correction unit.

11. A defective-pixel-correction device which corrects an output signal of a defective pixel detected on a solid-image-pickup element upon receiving an input signal of an image picked up by the solid-image-pickup element which can select a plurality of reading modes including an ordinary mode wherein signals of all of a plurality of pixels are read in sequence and at least one pixel-addition mode wherein signals of the plurality of pixels corresponding to filters of the same color are added to one another and output, the defective-pixel-correction device comprising:

a defective-information-storage unit operable to store position information of a defective pixel on the solid-image-pickup element, where the defective pixel is detected when the ordinary mode is selected;

a signal-correction unit operable to correct a pixel signal of at least one picked-up-image signal obtained by the solid-image-pickup element based on the position information stored in the defective-information storage unit, where the pixel signal corresponds to the position information; and a position-information conversion unit operable to convert the stored position information when the pixel-addition mode is selected, so that the converted position information agrees with information about an arrangement of pixels, the pixel-arrangement information corresponding to the picked-up-image signal generated in the pixel-addition mode, and that transmits the converted position information to the signal-correction unit.

12. A defective-pixel-correction method which corrects an output signal of a defective pixel detected on a solid-image-pickup element upon receiving an input signal of an image picked up by the solid-image-pickup element which can select a plurality of reading modes including an ordinary mode wherein signals of all of a plurality of pixels are read in sequence and at least one pixel-addition mode wherein signals of the plurality of pixels corresponding to filters of the same color are added to one another and output, the defective-pixel-correction method comprising:

storing position information of the defective pixel detected on the solid-image-pickup element when the ordinary mode is selected;

correcting a pixel signal of at least one picked-up-image signal obtained by the solid-image-pickup element based on the stored position information, where the pixel signal corresponds to the position information and the correction step is performed by a signal-correction unit; and converting the stored position information when the pixel-addition mode is selected so that the converted position information agrees with information about an arrangement of pixels, the pixel-arrangement information corresponding to the picked-up-image signal generated in the pixel-addition mode, and transmitting the converted position information to the signal-correction unit.

* * * * *